United States Patent
Mackenzie et al.

(10) Patent No.: US 11,787,298 B2
(45) Date of Patent: Oct. 17, 2023

(54) MULTIPLE CHARGE INTERFACE MONITORING AND PROTECTION SYSTEM FOR ELECTRIFIED VEHICLES

(71) Applicant: FORD GLOBAL TECHNOLOGIES, LLC, Dearborn, MI (US)

(72) Inventors: Kevin Mackenzie, Canton, MI (US); Jonathan Barker, Ann Arbor, MI (US); Theodore Joseph Filippi, Brownstown, MI (US); William A. Paxton, Redwood City, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 199 days.

(21) Appl. No.: 17/080,092

(22) Filed: Oct. 26, 2020

(65) Prior Publication Data
US 2022/0126711 A1   Apr. 28, 2022

(51) Int. Cl.
*H02J 7/14* (2006.01)
*H02J 7/00* (2006.01)
*B60L 53/14* (2019.01)
*B60L 53/12* (2019.01)

(52) U.S. Cl.
CPC ............... *B60L 53/14* (2019.02); *B60L 53/12* (2019.02); *B60L 2250/10* (2013.01); *B60L 2250/16* (2013.01)

(58) Field of Classification Search
CPC ...... B60L 53/14; B60L 53/12; B60L 2250/10; B60L 2250/16
USPC ........................................................ 320/106
See application file for complete search history.

(56) References Cited

U.S. PATENT DOCUMENTS

| | | | |
|---|---|---|---|
| 8,028,780 B2 * | 10/2011 | Sagawa | B60L 53/16 903/930 |
| 8,720,968 B2 | 5/2014 | Zalan et al. | |
| 10,637,258 B2 | 4/2020 | Ando | |
| 2009/0057041 A1 * | 3/2009 | Kamaga | B60L 58/14 340/687 |
| 2009/0079389 A1 * | 3/2009 | Ohtomo | B60L 50/16 320/109 |
| 2013/0076059 A1 * | 3/2013 | Zalan | B60L 53/16 49/386 |
| 2013/0326955 A1 * | 12/2013 | Kotama | E05B 83/34 49/13 |
| 2015/0048644 A1 * | 2/2015 | Georgi | E05B 83/34 296/97.22 |

(Continued)

FOREIGN PATENT DOCUMENTS

CN   110525247 A   12/2019
DE   10 2011 118957 A1   5/2013

*Primary Examiner* — Alexis B Pacheco
(74) *Attorney, Agent, or Firm* — David B. Kelley; Carlson, Gaskey & Olds, P.C.

(57) ABSTRACT

This disclosure relates to electrified vehicle charging systems that are equipped with multiple charging interfaces. An exemplary charging system may include a first charging interface, a second charging interface, an on-board charger module operably coupled to the first and second charging interfaces, and a control module configured to command the second charging interface to be isolated from the on-board charger module in response to a status change of a door of the first charging interface. The status of the door may be monitored by a sensor system of the charging system for determining whether or not to disable the second charging interface.

17 Claims, 3 Drawing Sheets

(56) References Cited

U.S. PATENT DOCUMENTS

| | | | |
|---|---|---|---|
| 2018/0226813 A1* | 8/2018 | Ando | B60L 53/12 |
| 2018/0236889 A1* | 8/2018 | Masuda | B60L 53/126 |
| 2019/0106007 A1* | 4/2019 | Spesser | B60L 53/22 |
| 2020/0353839 A1* | 11/2020 | Tarchinski | B60L 58/12 |
| 2021/0242691 A1* | 8/2021 | Hao | B60L 53/31 |

* cited by examiner

MULTIPLE CHARGE INTERFACE MONITORING AND PROTECTION SYSTEM FOR ELECTRIFIED VEHICLES

TECHNICAL FIELD

This disclosure relates generally to electrified vehicles, and more particularly to systems and methods for monitoring charging on electrified vehicles that are equipped with multiple charging interfaces.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Some electrified vehicles, such as plug-in hybrid electric vehicles (PHEVs) and battery electric vehicles (BEVs), include a charging interface that is connectable to electric vehicle supply equipment (EVSE) for charging the traction battery pack.

SUMMARY

A charging system for an electrified vehicle according to an exemplary aspect of the present disclosure includes, among other things, a first charging interface, a second charging interface, an on-board charger module operably coupled to the first and second charging interfaces, and a control module configured to issue a first shutdown signal for isolating the second charging interface from the on-board charger module in response to a status change of a door of the first charging interface.

In a further non-limiting embodiment of the foregoing charging system, a battery pack is configured to receive power from the on-board charger module.

In a further non-limiting embodiment of either of the foregoing charging systems, the first charging interface includes a charge port assembly and the second charging interface includes a hands-free charger.

In a further non-limiting embodiment of any of the foregoing charging systems, the first charging interface includes a first charge port assembly and the second charging interface includes a second charge port assembly.

In a further non-limiting embodiment of any of the foregoing charging systems, the status change includes movement of the door from a closed position to an open position.

In a further non-limiting embodiment of any of the foregoing charging systems, the charging system includes a sensor system configured to monitor a position of the door.

In a further non-limiting embodiment of any of the foregoing charging systems, the sensor system includes a first hall effect sensor and a second hall effect sensor.

In a further non-limiting embodiment of any of the foregoing charging systems, the control module is configured to compare a first signal received from the first hall effect sensor with a second signal received from the second hall effect sensor to determine whether to issue the first shutdown signal.

In a further non-limiting embodiment of any of the foregoing charging systems, the control module is configured to communicate the first shutdown signal to the on-board charger module in response to the status change of the door. The on-board charger module is configured to communicate a second shutdown signal to a contactor system of an electric vehicle supply equipment associated with the second charging interface in response to receiving the first shutdown signal.

In a further non-limiting embodiment of any of the foregoing charging systems, the contactor system is configured to open at least one contactor in response to receiving the second shutdown signal.

In a further non-limiting embodiment of any of the foregoing charging systems, a hands-free ground transmitter module of the electric vehicle supply equipment is disabled in response to opening the at least one contactor of the contactor system.

In a further non-limiting embodiment of any of the foregoing charging systems, the door is part of a charge port assembly that includes an inlet port configured to receive a charge coupler of an electric vehicle supply equipment.

A method according to another exemplary aspect of the present disclosure includes, among other things, monitoring a position of a door of a first charging interface of an electrified vehicle charging system when charging a traction battery pack via a second charging interface of the charging system, and automatically disabling the second charging interface in response to a status change of the door.

In a further non-limiting embodiment of the foregoing method, monitoring the position of the door includes sensing, via a sensor system, whether the door is closed or opened.

In a further non-limiting embodiment of either of the foregoing methods, the sensor system includes a first hall effect sensor and a second hall effect sensor. Monitoring the position of the door includes comparing a first signal received from the first hall effect sensor with a second sensor received from the second hall effect sensor, and disabling the second charging interface when the first signal is different from the second signal.

In a further non-limiting embodiment of any of the foregoing methods, the status change includes movement of the door from a closed position to an open position.

In a further non-limiting embodiment of any of the foregoing methods, disabling the second charging interface includes shutting down a hands-free ground transmitter module of an electric vehicle supply equipment associated with the second charging interface.

In a further non-limiting embodiment of any of the foregoing methods, shutting down the hands-fee ground transmitter module includes controlling a contactor system to prevent power from being communicated from an external power source to the hands-free ground transmitter module.

In a further non-limiting embodiment of any of the foregoing methods, the method includes issuing an alert in response to disabling the second charging interface.

In a further non-limiting embodiment of any of the foregoing methods, issuing the alert includes honking a horn, flashing lights, or issuing a notification to a personal electronic device of a user.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to electrified vehicle charging systems that are equipped with multiple charging interfaces. An exemplary charging system may include a first charging interface, a second charging interface, an on-board charger module operably coupled to the first and second charging interfaces, and a control module configured to command the second charging interface to be isolated from the on-board charger module in response to a status change of a door of the first charging interface. The status of the door may be monitored by a sensor system of the charging system for determining whether or not to disable the second charging interface. These and other features of this disclosure are discussed in greater detail in the following paragraphs of this detailed description.

Figure 1:
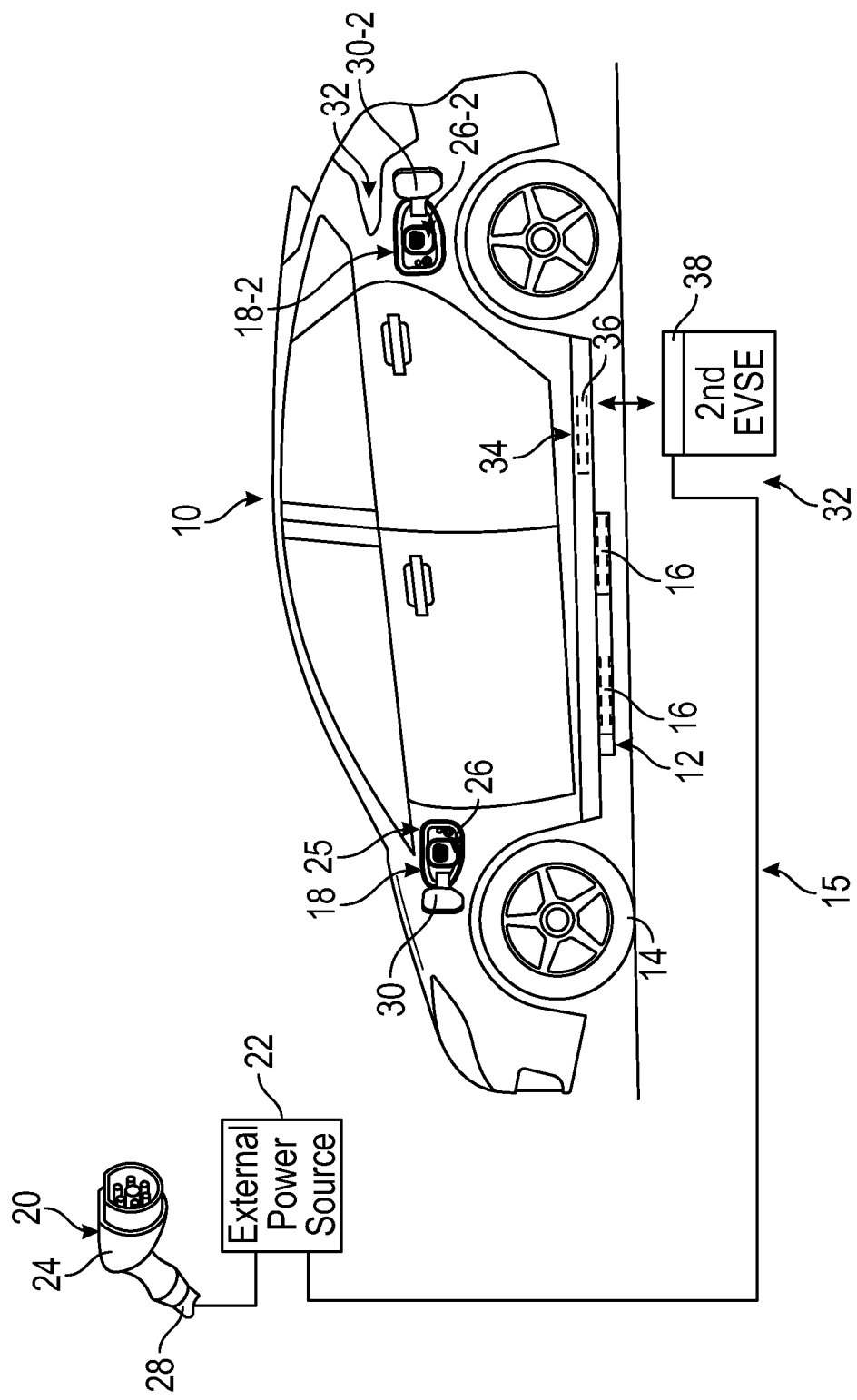
FIG. 1 is a side view of an electrified vehicle equipped with a charging system that includes multiple charging interfaces.

FIG. 1 schematically illustrates an exemplary electrified vehicle 10 that includes a traction battery pack 12. The electrified vehicle 10 may include any electrified powertrain capable of applying a torque from an electric machine (e.g., an electric motor) for driving drive wheels 14 of the electrified vehicle 10. In an embodiment, the electrified vehicle 10 is a plug-in hybrid electric vehicle (PHEV). In another embodiment, the electrified vehicle is a battery electric vehicle (BEV). Therefore, the powertrain may electrically propel the drive wheels 14 either with or without the assistance of an internal combustion engine.

The electrified vehicle 10 of FIG. 1 is schematically illustrated as a car. However, the teachings of this disclosure may be applicable to any type of vehicle, including but not limited to, cars, trucks, vans, sport utility vehicles (SUVs), etc.

Although shown schematically, the traction battery pack 12 may be a high voltage traction battery pack that includes a plurality of battery arrays 16 (i.e., battery assemblies or groupings of battery cells) capable of outputting electrical power to one or more electric machines of the electrified vehicle 10. Other types of energy storage devices and/or output devices may also be used to electrically power the electrified vehicle 10.

From time to time, charging the energy storage devices of the traction battery pack 12 may be required or desirable. The electrified vehicle 10 may therefore be equipped with a charging system 15 for charging the energy storage devices (e.g., battery cells) of the traction battery pack 12. The charging system 15 may be connected to an external power source 22 for receiving and distributing power to the battery cells of the traction battery pack 12. In an embodiment, the external power source 22 includes utility grid power. In another embodiment, the external power source 22 includes an alternative energy source, such as solar power, wind power, etc. In yet another embodiment, the external power source 22 includes a combination of utility grid power and alternative energy sources. The external power source 22 may be located at a home of the user, a public charging station, etc.

The charging system 15 may include multiple charging interfaces. A first charging interface 25 of the charging system 15 may include a charge port assembly 18 (sometimes referred to as a vehicle inlet assembly) mounted on the electrified vehicle 10. A first electric vehicle supply equipment (EVSE) 20 may be operably connected between the charge port assembly 18 and the external power source 22 for transferring power therebetween. The first EVSE 20 may include a charger coupler 24 that can be coupled to an inlet port 26 of the charge port assembly 18 to charge the traction battery pack 12 of the electrified vehicle 10 from the external power source 22. A cable 28 of the first EVSE 20 may connect between the charger coupler 24 and a power outlet or charging station that is operably connected to the external power source 22.

The charge port assembly 18 may include a charge port door 30 that is closed during typical operation of the electrified vehicle 10. When charging the electrified vehicle 10 from the external power source 22 is desired, the charge port door 30 can be moved from a closed position to an open position, and a user can then connect the charger coupler 24 of the first EVSE 20 to the inlet port 26 of the charge port assembly 18 so that power from the external power source 22 can be provided to the traction battery pack 12 of the electrified vehicle 10 for charging the battery cells contained therein.

The inlet port 26 of the exemplary charge port assembly 18 may be configured to receive AC power, DC power, or both from the external power source 22. The first EVSE 20 may thus be configured to provide any level of charging (e.g., level 1, level 2, DC, etc.).

A second charging interface 32 of the charging system 15 may include a hands-free charger 34. The hands-free charger 34 may be a hands-free inductive charger or a hands-free conductive charger. The hands-free charger 34 may include a hands-free vehicle receiver module 36 mounted on the electrified vehicle 10. The hands-free vehicle receiver module 36 is configured to wirelessly receive power from a hands-free ground transmitter module 38 of a second EVSE 40 for wirelessly charging the traction battery pack 12 from the external power source 22.

Alternatively, the second charging interface 32 of the charging system 15 could be established by an additional charge port assembly 18-2 that includes an inlet port 26-2 and a charge port door 30-2. If provided, the charge port assembly 18-2 may be disposed either on the same side or a different side of the electrified vehicle 10 relative to the charge port assembly 18.

In yet another embodiment, the electrified vehicle 10 could include each of the charge port assembly 18, the hands-free charger 34, and the charge port assembly 18-2 in order to equip the electrified vehicle 10 with three charging interfaces. The electrified vehicle 10 could include two or more charging interfaces within the scope of this disclosure.

When charging the traction battery pack 12 via the second charging interface 32, a conductive path may be established within the electrified vehicle 10, thereby energizing the first charging interface 25. The conductive path may result in the presence of a high voltage current on the charge port assembly 18, which may be undesirable. This disclosure therefore describes systems and methods for monitoring charging of electrified vehicles that are equipped with multiple charging interfaces in order to ensure that high voltage is not present on the charge port assembly 18 when a user has indicated a desire to charge via the first charging interface 25. For example, as explained in greater detail below, the second charging interface 32 can automatically be isolated from the electrified vehicle 10, and is therefore incapable of applying high voltage current to the electrified vehicle 10, when the user has opened the charge port door 30 of the charge port assembly 18 of the first charging interface 25.

Figure 2:
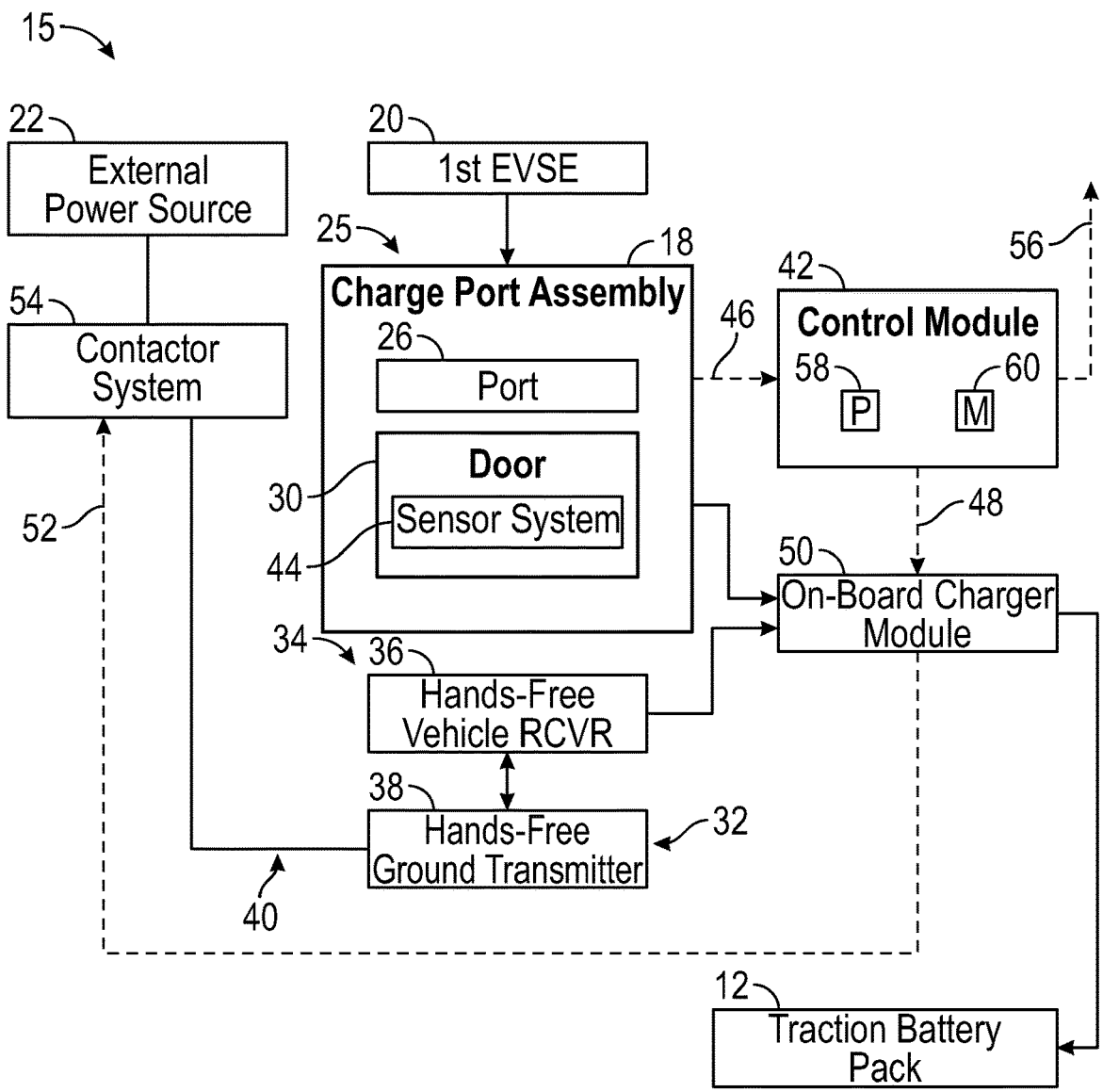
FIG. 2 is a block diagram of an electrified vehicle charging system that includes multiple charging interfaces.

An exemplary charging system 15 of the electrified vehicle 10 of FIG. 1 is schematically depicted in FIG. 2. The charging system 15 may include a control module 42 that is configured to monitor a status of the charge port door 30 of the charge port assembly 18 and automatically command the second charging interface 32 to shutdown when the charge port door 30 is moved from a closed position, in which the inlet port 26 is not exposed, to an open position, in which the inlet port 26 is exposed for connection to the first EVSE 20. The control module 42 may be mounted on-board the electrified vehicle 10.

The charge port assembly 18 may include a sensor system 44 that is configured to monitor the status of the charge port door 30. In an embodiment, the sensor system 44 monitors whether the charge port door 30 is in the closed position or the open position when the electrified vehicle 10 is being charged via the second charging interface 32 (e.g., the hands-free charger 34). When the charge port door 30 is moved to the open position, the sensor system 44 may communicate a door status signal 46 to the control module 42.

In response to receiving the door status signal 46, the control module 42 may communicate a first shutdown signal 48 to an on-board charger module 50 of the charging system 15. The on-board charger module 50 is mounted on the electrified vehicle 10 and is operably coupled to the first charging interface 25 and the second charging interface 32. The on-board charger module 50 may be equipped with the necessary power electronics for converting AC power received from either the first charging interface 25 or the second charging interface 32 to DC power for charging the energy storage devices of the traction battery pack 12. The on-board charger module 50 may further be equipped to perform various inverting and rectifying operations.

In response to receiving the first shutdown signal 48 from the control module 42, the on-board charger module 50 may communicate a second shutdown signal 52 to a contactor system 54 of the second EVSE 40 associated with the second charging interface 32. Alternatively, the control module 42 may communicate directly with the contactor system 54. The contactor system 54 may include a plurality of contactors that can be controlled to isolate the second charging interface 32 from the on-board charger module 50. In an embodiment, the contactors of the contactor system 54 may be automatically commanded to an open position in response to receiving the second shutdown signal 52. When the contactors are opened, the hands-free ground transmitter module 38 of the second EVSE 40 is disabled and cannot receive power from the external power source 22. Therefore, the hands-free charger 34 is inactive and thus not capable of providing a high voltage current to the on-board charger module 50. A high voltage current therefore cannot be applied on the first charging interface 25 from the second charging interface 32. However, the first charging interface 25 remains available for charging the traction battery pack 12.

The control module 42 may issue an alert command signal 56 once the second charging interface 32 has been shutdown/isolated from the electrified vehicle 10. The alert command signal 56 may command the issuance of an audible or visual alert to a user, such as by communicating with another control module of the electrified vehicle 10, for example. The alert may include honking a horn, flashing lights, issuing a notification to a personal electronic device of the user, etc.

The control module 42 may include a processing unit 58 and non-transitory memory 60 for executing the various control strategies and modes of the charging system 15. The control module 42 may be configured to receive various inputs, analyze these inputs, and then command various operations of the charging system 15.

The processing unit 58 can be a custom made or commercially available processor, a central processing unit (CPU), or generally any device for executing software instructions. The memory 60 can include any one or combination of volatile memory elements and/or nonvolatile memory elements. The processing unit 58 is configured to execute one or more programs stored in the memory 60.

Figure 3:
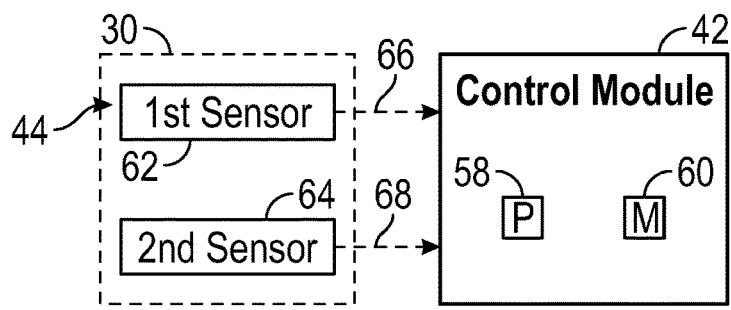
FIG. 3 is a circuit diagram of a sensor system of an electrified vehicle charging system.

FIG. 3, with continued reference to FIGS. 1 and 2, schematically illustrates additional details of the sensor system 44 of the charging system 15. The sensor system 44 may include a first sensor 62 and a second sensor 64. The first sensor 62 and the second sensor 64 may be mounted to other imbedded within the charge port door 30 of the charge port assembly 18.

The first sensor 62 and the second sensor 64 may be operably connected to the control module 42. In an embodiment, the first sensor 62 and the second sensor 64 are hall effect sensors that are configured to detect the presence of a magnetic field in order to determine whether the charge port door 30 is open or shut. However, other types of sensors could alternatively be used. By implanting two sensors within the charge port door 30, the sensor system 44 can provide a redundant door monitoring system.

The first sensor 62 may periodically communicate first sensor signals 66 to the control module 42, and the second sensor 64 may periodically communicate second sensor signals 68 to the control module 42. In an embodiment, the first and second sensor signals 66, 68 may together establish the door status signal 46.

The control module 42 may compare the first sensor signals 66 and the second sensors signals 68 to determine whether the first shutdown signal 48 should be communicated to the on-board charger module 50. In an embodiment, the second charging interface 32 is disabled when the first and second sensor signals 66, 68 are not the same (e.g., one reads "0" and the other reads "1"). In another embodiment, the second charging interface 32 is disabled when the control module 42 is not able to read the first and second sensor signals 66, 68. In yet another embodiment, the second charging interface 32 is not disabled and therefore capable of charging the traction battery pack 12 when the first and second sensor signals 66, 68 are the same.

Figure 4:
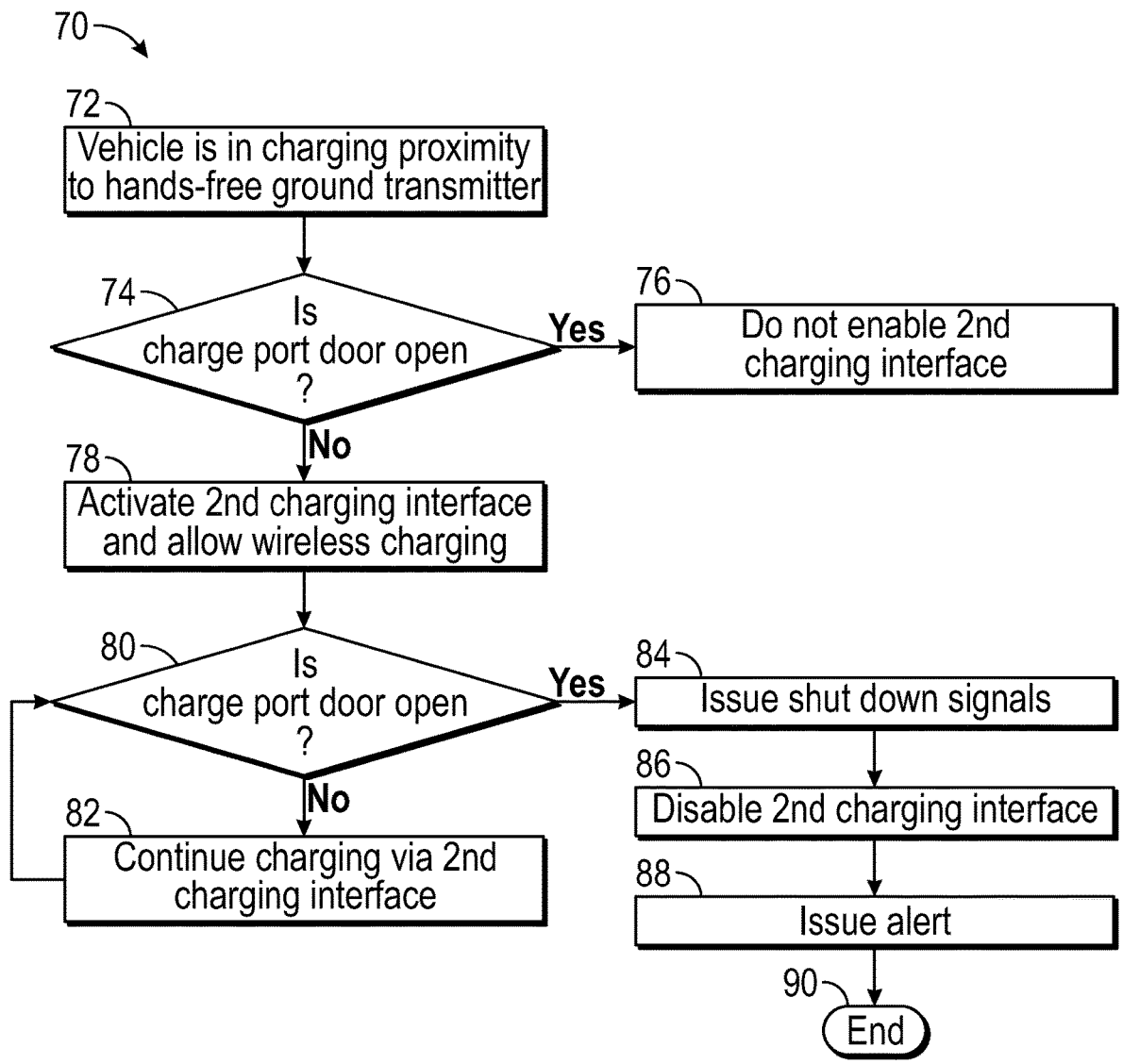
FIG. 4 schematically illustrates an exemplary method for monitoring charging of an electrified vehicle equipped with multiple charging interfaces.

FIG. 4, with continued reference to FIGS. 1-3, schematically illustrates an exemplary method 70 for controlling the charging of an electrified vehicle 10 that is equipped with multiple charging interfaces (e.g., both a charge port assembly 18 and a hands-free charger 34). In an embodiment, the processing unit 58 of the control module 42 is programmed with one or more algorithms adapted to execute the exemplary method 70.

The exemplary method 70 may begin at block 72 when the electrified vehicle 10 is positioned (e.g., parked) in charging proximity relative to the hands-free ground transmitter module 38 of the second EVSE 40. Next, at block 74, the control module 42 may determine whether the charge port door 30 of the charge port assembly 18 is open. The control module 42 may make this determination based on signals received from the first and second sensors 62, 64 of the sensor system 44, for example.

If a "YES" flag is returned at block 74, the second charging interface 32 is not enabled at block 76. Therefore, the traction battery pack 12 cannot be wirelessly charging using the second charging interface 32.

Alternatively, if a "NO" flag is returned at block 74, the second charging interface 32 may be activated at block 78. Therefore, the traction battery pack 12 can be wirelessly charged via the second charging interface 32.

The control module 42 may continue to monitor the status of the charge port door 30 at block 80. If the charge port door 30 remains closed, charging may continue via the second charging interface 32 at block 82. Alternatively, if the charge port door 30 is determined to be open at block 80, the method 70 may continue to block 84. At this step, the control module 42 may issue the first shutdown signal 48, which then results in the on-board charger module 50 issuing the second shutdown signal 52. The second charging interface 32 is thus disabled at block 86. An alert may be communicated to the user at block 88. The method 70 may then end at block 90.

The charging systems of this disclosure provide an improved monitoring, protection, and control system for electrified vehicles equipped with multiple charging interfaces. The exemplary charging system employ sensors for monitoring the status of the charge port door and can shut down charging interfaces as necessary based on the door status, thereby significantly reducing costs associated with motorized and/or lockable charge port assemblies.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A charging system for an electrified vehicle, comprising:
    a first charging interface;
    a second charging interface;
    an on-board charger module operably coupled to the first and second charging interfaces; and
    a control module configured to issue a first shutdown signal for isolating the second charging interface from the on-board charger module in response to a status change of a door of the first charging interface,
    wherein the control module is configured to communicate the first shutdown signal to the on-board charger module in response to the status change of the door, and further wherein the on-board charger module is configured to communicate a second shutdown signal to a contactor system of an electric vehicle supply equipment associated with the second charging interface in response to receiving the first shutdown signal.

2. The charging system as recited in claim 1, wherein the first charging interface includes a charge port assembly and the second charging interface includes a hands-free charger.

3. The charging system as recited in claim 1, wherein the first charging interface includes a first charge port assembly and the second charging interface includes a second charge port assembly.

4. The charging system as recited in claim 1, wherein the status change includes movement of the door from a closed position to an open position.

5. The charging system as recited in claim 1, comprising a sensor system configured to monitor a position of the door.

6. The charging system as recited in claim 5, wherein the sensor system includes a first hall effect sensor and a second hall effect sensor.

7. A charging system for an electrified vehicle, comprising:
    a first charging interface;
    a second charging interface;
    an on-board charger module operably coupled to the first and second charging interfaces;
    a control module configured to issue a first shutdown signal for isolating the second charging interface from the on-board charger module in response to a status change of a door of the first charging interface; and
    a sensor system configured to monitor a position of the door, wherein the sensor system includes a first hall effect sensor and a second hall effect sensor,
    wherein the control module is configured to compare a first signal received from the first hall effect sensor with a second signal received from the second hall effect sensor to determine whether to issue the first shutdown signal.

8. The charging system as recited in claim 1, comprising a battery pack configured to receive power from the on-board charger module.

9. The charging system as recited in claim 1, wherein the contactor system is configured to open at least one contactor in response to receiving the second shutdown signal.

10. The charging system as recited in claim 9, wherein a hands-free ground transmitter module of the electric vehicle supply equipment is disabled in response to opening the at least one contactor of the contactor system.

11. The charging system as recited in claim 1, wherein the door is part of a charge port assembly that includes an inlet port configured to receive a charge coupler of the electric vehicle supply equipment.

12. The charging system as recited in claim 8, wherein the on-board charger module is configured to convert AC power received from either the first charging interface or the second charging interface to DC power for charging the battery pack.

13. The charging system as recited in claim 12, wherein the on-board charger module is positioned between the battery pack and each of the first charging interface and the second charging interface.

14. The charging system as recited in claim 1, wherein the first shutdown signal is configured to disable a hands-free ground transmitter module of the second charging interface.

15. The charging system as recited in claim 1, wherein the control module is further configured to command an alert in response to isolating the second charging interface from the on-board charger module.

16. The charging system as recited in claim 15, wherein the alert includes honking a horn, flashing lights, or providing a notification to a personal electronic device of a user.

17. The charging system as recited in claim 6, wherein the first hall effect sensor and the second hall effect sensor are each imbedded within the door.

* * * * *